UNITED STATES PATENT OFFICE.

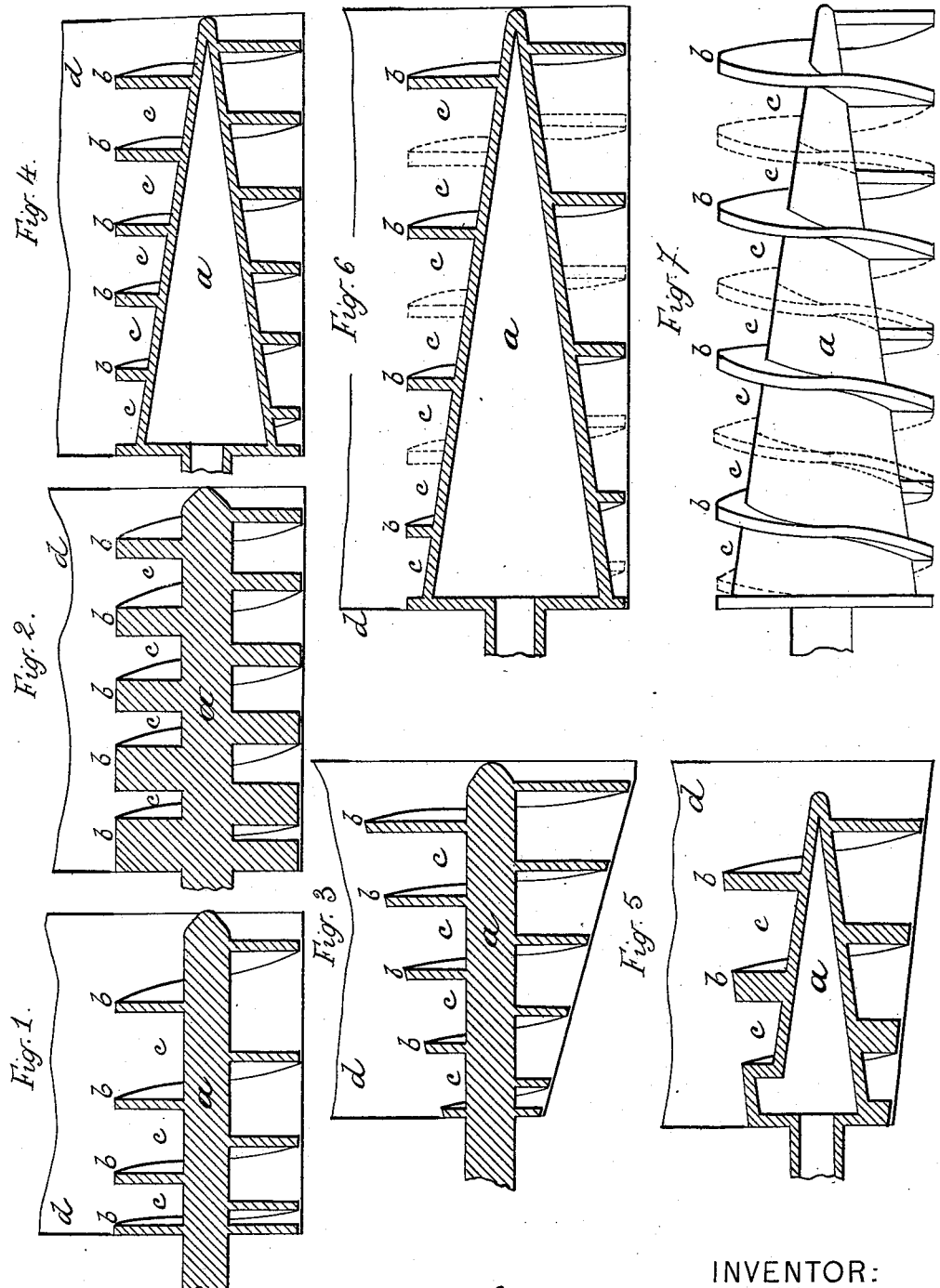

GEORGES ALEXIS-GODILLOT, OF PARIS, FRANCE.

MECHANICAL FEEDER FOR FURNACES.

SPECIFICATION forming part of Letters Patent No. 363,953, dated May 31, 1887.

Application filed October 5, 1886. Serial No. 215,343. (No model.) Patented in France November 25, 1884, No. 158,819; in Belgium December 15, 1884, No. 67,223; in Germany December 18, 1884, No. 33,224; in Austria-Hungary March 21, 1885, No. 47,095 and No. 15,203, and in Spain October 22, 1885, No. 7,667.

*To all whom it may concern:*

Be it known that I, GEORGES ALEXIS-GODILLOT, a citizen of the French Republic, and a resident of Paris, France, have invented certain new and useful Improvements in Mechanical Feeders for Furnaces, (for which patents have been granted in France, No. 158,819, dated November, 25, 1884; in Belgium, No. 67,223, dated December 15, 1884; in Spain, No. 7,667, dated October 22, 1885; in Austria-Hungary No. 47,095 and No. 15,203, dated March 21, 1885; in Germany, No. 33,224, dated December 18, 1884,) of which the following is a specification.

My invention relates to that class of mechanical feeders or "automatic stokers" wherein a screw or helix, continuously revolving in a parti-cylindrical casing under a hopper, serves to feed the fuel into the furnace.

In this class of feeders the screw or helix has heretofore been constructed uniform throughout its length—that is to say, the spaces between the turns of the screw-thread have been of uniform capacity from one end of the screw to the other. I find that in the operation of such feeders, especially when the fuel fed is spent tan-bark, chips, or similar refuse, the fuel packs in the channel or trough between the threads of the rotating screw, which is caused in the main by the pressure of the superincumbent mass in the hopper; but the fact that the feed is almost entirely at the outer end of the screw also aids greatly in packing the mass densely in the spiral trough, thus causing an enormous amount of friction between the moving fuel and the stationary mass above and the said fuel and the thread or spiral blade of the screw itself.

The object of my invention is to avoid this friction and choking of the screw; and to that end my invention consists in so constructing the screw that the troughs or spaces between the screw-threads thereon increase in capacity from the outer end of the screw to the discharging or delivery end, whereby I not only avoid the close packing of the fuel, but the fuel is fed vertically down from the hopper throughout the whole length of the screw; because of this increasing capacity of the spaces along the same.

In carrying out my invention I am able to effect this continuous increase in the capacity of the troughs or spaces between the threads of the screw in various ways, as illustrated in the accompanying drawings.

First. By increasing the pitch of the screw-thread from the outer end to the delivery end of the screw. This is illustrated in Fig. 1, which is a longitudinal section of the screw and casing, *a* representing the axis or core of the screw, *b* the turns of the screw-thread, *c* the trough or space between the turns of the screw-thread, and *d* the casing.

Second. By diminishing the thickness of the screw-thread *b* from the outer end to the delivery end of the screw without varying the pitch. This is illustrated in Fig. 2, which is a sectional view similar to Fig. 1.

Third. By gradually increasing the width of the screw-thread from the outer end to the delivery end of the screw. This is illustrated in Fig. 3, which is a sectional view similar to Fig. 1.

Fourth. By gradually diminishing the diameter of the axis *a* or tapering it, the outer circumference of the screw remaining uniformly cylindrical. This is illustrated in Fig. 4, which is a sectional view similar to Fig. 1.

Fifth. By combining two or more of these forms or constructions of the screw. This is illustrated in Fig. 5, which is a sectional view similar to Fig. 1, and which combines all of the forms found in the first four figures.

Fig. 6 is a longitudinal section, and Fig. 7 a plan view of a feeding-screw constructed as shown in Fig. 4, but having portions of the screw-thread *b* cut away, so as to break or interrupt its continuity. In these views the portion cut away is indicated in dotted lines and the remaining portion in full lines. The purpose of this will be explained.

For feeding certain kinds of fuel, notably bagasse, which contains fibers or thread-like filaments, these are apt to extend across from one turn of the screw-thread to that next adjacent and form a bridge-like impediment to the descent of the fuel into the space c between. This is obviated by the interruption of the screw-thread, as the fiber will fall into these spaces of double width and be carried along by the continued rotation of the screw.

For convenience of description I have herein referred to the spiral trough of the screw as the spaces or intervals c c. In a feeder of this character this trough appears to the eye as if made up of a succession of spaces or recesses separated by turns of the screw-thread.

Having thus described my invention, I claim—

1. The combination, with a screw for feeding fuel to a furnace in which the space or interval c between the turns of the screw-thread b increases continuously in capacity from the outer end to the delivery end of the screw, of the casing d, in which said screw is rotatively mounted, said screw being arranged to stand in close proximity to the lower part of said casing throughout the whole length of the screw, whereby the said casing is made to closely house said screw at its lower part, as set forth.

2. A screw for mechanically feeding fuel to a furnace, which has a uniform pitch and a uniform exterior diameter, and which has an axis or core, a, the diameter of which tapers from the outer end to the delivery end of the screw.

3. A screw for mechanically feeding fuel to a furnace in which the space or interval c between the turns of the screw-thread b increases continuously in capacity from the outer end of the screw to its delivery end, and said screw having the continuity of its said screw-thread broken at intervals, substantially as set forth.

In witness whereof I have hereunto signed my name in the presence of two subscribing witnesses.

GEORGES ALEXIS-GODILLOT.

Witnesses:
CHARLES MARDELET,
AMAND RITTER.